F. A. WHEELOCK.
BRUSH DRUM FOR CULTIVATORS AND WEEDERS.
APPLICATION FILED FEB. 2, 1912.
1,084,987.
Patented Jan. 20, 1914.
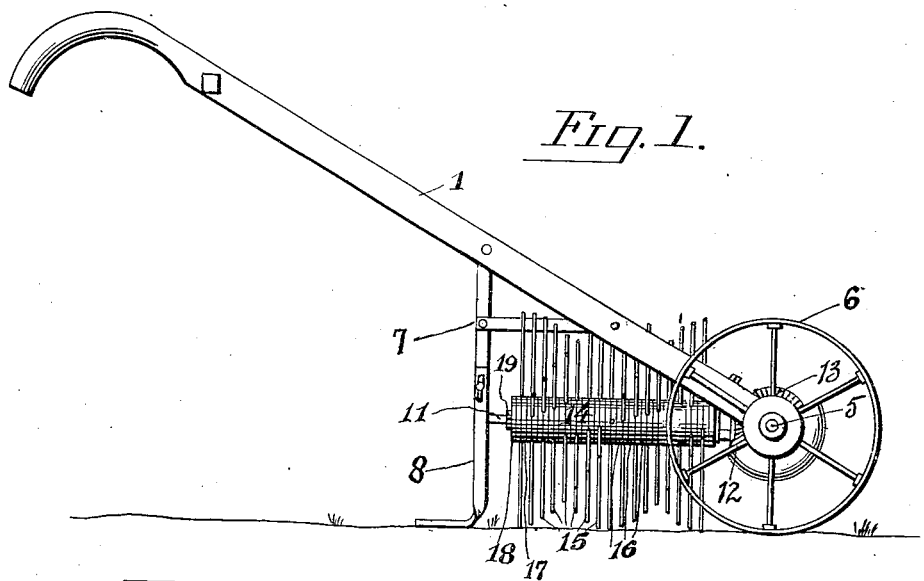
Fig. 1.
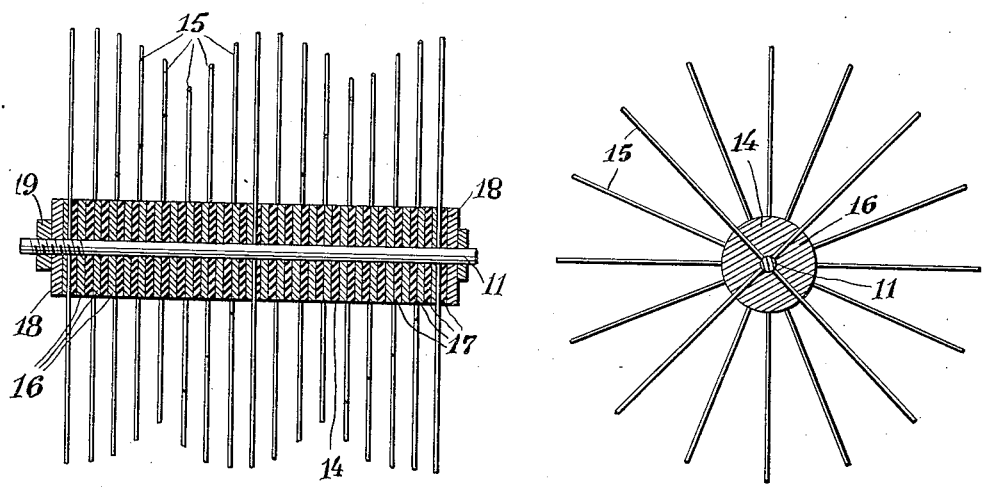
Fig. 2.
Fig. 3.
Witnesses
M. H. Garnett
C. C. Hines
Inventor
Fred A. Wheelock
By Victor J. Evans
Attorney
COLUMBIA PLANOGRAPH CO., WASHINGTON, D. C.

UNITED STATES PATENT OFFICE.

FRED A. WHEELOCK, OF MADISON, OHIO.

BRUSH-DRUM FOR CULTIVATORS AND WEEDERS.

1,084,987. Specification of Letters Patent. Patented Jan. 20, 1914.

Application filed February 2, 1912. Serial No. 674,961.

*To all whom it may concern:*

Be it known that I, FRED A. WHEELOCK, a citizen of the United States, residing at Madison, in the county of Lake and State of Ohio, have invented new and useful Improvements in Brush-Drums for Cultivators and Weeders, of which the following is a specification.

The invention consists of the features of construction, combination and arrangement of parts, hereinafter fully described and claimed, reference being had to the accompanying drawings, in which:—

Figure 1 is a side elevation showing the application of the invention to a combined cultivator and weeder. Fig. 2 is an enlarged longitudinal section through the brush cylinder. Fig. 3 is a transverse section thereof.

Referring to the drawing, 1 designates the main frame of the implement, provided with suitable handles 2. Journaled at the forward end of the frame is a transverse shaft 5, on which are fixed supporting wheels 6. Depending from the main frame in rear of the shaft is a bracket 7 terminating in suitable supporting or gage members 8. The main frame 1 and bracket 7 are provided with bearings for a longitudinally extending shaft 11, the forward end of which carries a beveled gear pinion 12 meshing with a beveled driving gear 13 on the shaft or axle 5, whereby in the travel of the implement the said shaft 11 is driven.

Mounted upon the shaft 11 is a drum or cylinder 14 carrying spring wire brushes or fingers 15, which in the rotation of the shaft and cylinder are adapted to sweep over the surface of the ground and rake up the earth about the plants, and at the same time cut out and destroy the starting weeds. These brushes or fingers are made of spring wire of a suitable gage and are yieldingly mounted, to allow them to ride over obstructions without breakage and to slide over portions of the plants without injury thereto. To this end, the drum or cylinder is made up of a sectional body, between the sections of which the brush fingers or wires are clamped. The sections of the body are preferably in the form of disks or washers, and are shown in the present instance as consisting of alternately arranged card-board and rubber washers 16 and 17 held assembled by end clamping heads 18 and nuts 19. This construction of the drum or cylinder permits ready renewal of the worn parts and adapts the brush fingers to yield without liability of injury.

In operation, the implement is drawn or pushed along the spaces between the rows or plants and the motion is transmitted through suitable drive gearing to rotate the brush cylinder. The spring brushes enter and loosen up the earth about the plants, thus cultivating the plants, and at the same time uproot or destroy the starting weeds. The implement is primarily adapted for cultivating and weeding onions, and provides an efficient type of device for performing such service without injury to the plants, but may be employed for cultivating and weeding other plants similarly set out in rows. The spring brush fingers 15 are arranged spirally about the drum or cylinder, so that they will be closely grouped to act sufficiently upon the soil, but they may be otherwise arranged.

Having thus described the invention, I claim:

A brush drum for cultivators and weeders comprising a shaft, a brush body composed of a series of fiber and rubber disks arranged in alternation upon the shaft, clamping means for holding said disks assembled, and spirally arranged spring brush fingers clamped at their inner ends between the fiber and rubber disks.

In testimony whereof I affix my signature in presence of two witnesses.

FRED A. WHEELOCK.

Witnesses:
BERT B. FORBES,
OTTO TROUTMAN.